United States Patent [19]
Cardwell, Jr.

[11] 3,766,468
[45] Oct. 16, 1973

[54] INVERTER CIRCUIT
[75] Inventor: Gilbert I. Cardwell, Jr., Palos Verdes Peninsula, Calif.
[73] Assignee: The Garrett Corporation, Los Angeles, Calif.
[22] Filed: Feb. 1, 1972
[21] Appl. No.: 222,523

[52] U.S. Cl. ............................. 321/43, 321/45 C
[51] Int. Cl. ............................................. H02m 7/48
[58] Field of Search ............ 321/43–45, 45 C, 45 ER

[56] References Cited
UNITED STATES PATENTS
3,311,809 3/1967 Corey et al. ........................ 321/45 R
3,303,406 2/1967 Bedford ......................... 321/45 R X
3,242,352 3/1966 Long .................................. 321/45 C

*Primary Examiner*—William M. Shoop, Jr.
*Attorney*—Albert J. Miller et al.

[57] ABSTRACT

In an inverter circuit including a pair of input terminals with a constant potential difference therebetween, a gate-controlled diode connected between each input terminal and a load terminal, the combination of an inductor to limit the rate of current rise in each diode, a capacitor in parallel with each diode to limit the rate of voltage rise across each rectifier, and a means of recovering the stored energy in the capacitor.

8 Claims, 1 Drawing Figure

PATENTED OCT 16 1973
3,766,468
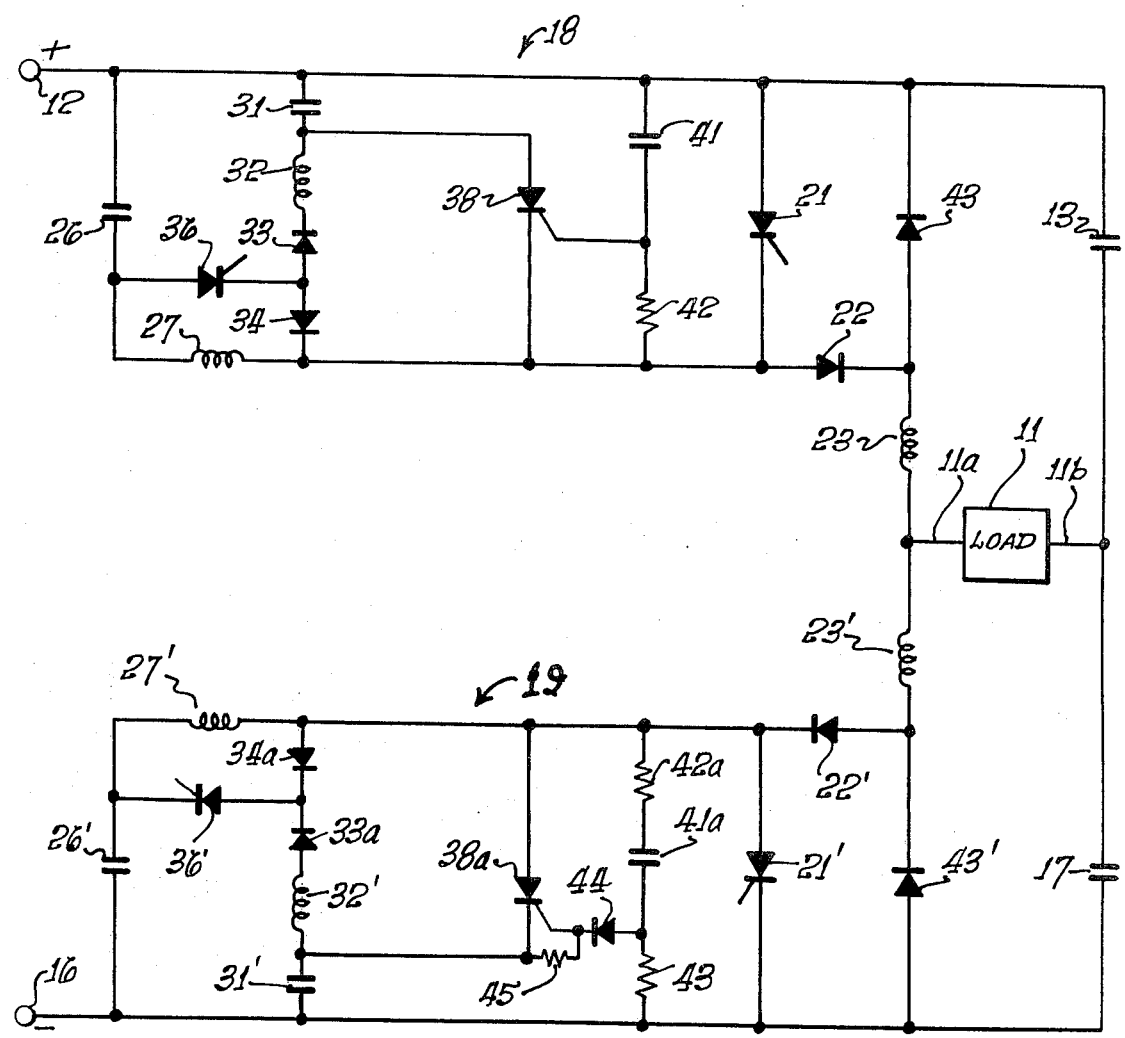

INVERTER CIRCUIT

This invention relates to networks for transferring unidirectional potential power into pulsating power and is particularly adapted to such networks in which gate-controlled diodes are used as the controlling valves.

Gate-controlled diodes of the thyristor type are commonly used to convert direct currect (DC) to alternating current (AC). Although these diodes are the best type of current controlling valves that can be used in inverter circuits, the diodes have at least two characteristics that degrade their performance. These characteristics are that, first, the rate of current rise through the diode at the start of conduction should be limited so as not to burn up the diodes and, second, after the diodes stop conducting, the rate of reapplying full voltage thereacross should also be limited because immediately after turn off the diode inherently cannot hold back full line voltage. Up to now, the load has to be designed to conform with the inverter circuit so that the rate of current rise is maintained within limits and resistor-capacitor networks have been placed across the diodes to limit the rate of voltage rise thereacross. Although these prior art solutions worked, they inherently produce losses in the network.

Therefore, an object of this invention is to provide a more efficient inverter circuit.

A feature of this invention is the provision of an inductor in series with a gate-controlled diode.

Another feature of this inventionis the provision invention is a capacitor in parallel with a gate-controlled diode with means for allowing the capacitor to charge immediately after the diode is switched to its nonconducting state and for discharging the capacitor before the diode is reswitched to its conducting state.

These and other objects and features of the present invention will become apparent from a review of the following specification and claims, when taken in conjunction with the drawing wherein the sole figure shows a schematic embodying the features of the invention.

DESCRIPTION OF THE DRAWING

Referring to the drawing, the schematic shows an inverter circuit that produces single phase AC power for a load 11 which may be, for example, an induction motor wherein the revolutions per minute (RPM) are directly related to the frequency of the AC input thereto. The invention is also useful in producing multiphase AC as will become evident to one skilled in the art after pursuing the following description. The load 11 has two terminals 11a and 11b. Terminal 11b is connected to a positive potential terminal 12 through a capacitor 13 and to a negative potential terminal 16 through another capacitor 17. The other input terminal 11a is connected to the positive terminal 12 through a network circuit 18 and to the negative terminal 16 through another network circuit 19. Circuits 18 and 19 are similar in function and are slightly dissimilar in structure because of the inherent characteristics of available circuit elements.

First circuit 18 will be described. A gate-controlled diode or rectifier 21 is coupled between positive terminal 12 to input terminal 11a through a diode or rectifier 22 and an inductor 23 so that when diode 21 is in the conducting state input terminal 11a is at the same potential as terminal 12. In parallel with the gate-controlled diode 21 are series connected capacitor 26 and inductor 27, and series connected capacitor 31, inductor 32 and diodes or rectifiers 33 and 34. The diodes 33 and 34 are connected "back to back" or anode to anode as shown. The anode of another gate-controlled diode or rectifier 36 is connected to the junction of capacitor 26 and inductor 27 and the cathode to the junction of diodes 33 and 34. The anode of another gate-controlled diode or rectifier 38 is connected to the junction of capacitor 31 and inductor 32 and the cathode is connected to the junction of gate-controlled diode 21 and diode 22. Series connected capacitor 41 and resistor 42 that are connected in parallel with the gate-controlled rectifier 21 form the control circuit for the gate-controlled diode 38 because its control terminal is connected to the junction formed by capacitor 41 and resistor 42 with the opposite end of resistor 42 being connected to the cathode of diode 38. A diode 43 is connected in parallel with series connected rectifier 21 and diode 22.

In the other circuit 19, the circuit elements that perform the same function and that are connected in the same manner as the circuit elements in circuit 18 are designated by prime numbers. For example, gate-controlled rectifier 21 of circuit 18 has a similar rectifier 21' in circuit 19. The circuit elements in circuit 19 that perform the same function as the circuit elements in circuit 18 but, due to their inherent characteristics, cannot be connected in a similar manner, are designated by an *a* following the number, for example, rectifier 38 in circuit 18 has a similar functioning rectifier 38a in circuit 19.

Gate-controlled diodes or rectifiers as used in this description are of the solid state devices and control current flow in a manner well known in the art. For persons not skilled in the art, the characteristics and operation of the gate-controlled rectifiers are as described in U. S. Pat. No. 3,074,030. As mentioned above, two interesting characteristics of gate-controlled rectifiers are that the rate of current rise (di/dt) is limited and the rate of voltage recovery (dv/dt) is also limited. As will become apparent in the operational description of the circuit, the means in this invention for limiting di/dt are the inductors 23 and 23' and the means for limiting the dv/dt are the capacitors 31 and 31' and gate-controlled rectifiers 38 and 38a.

DESCRIPTION OF OPERATION

At the beginning, assuming that the voltage applied to terminal 12 is positive and equal in value to the negative voltage applied to terminal 16 and assuming that none of the gate-controlled rectifiers are conducting, capacitors 26, 26', 13 and 17 all become charged, also capacitors 41 and 41a. Through a suitable control circuit (not shown) gate-controlled rectifiers 21 and 36' are switched on to their conducting state. Since both circuits 18 and 19 operate in the same manner the operational description of circuit 18 will first be given. Current flows through rectifier 21 to terminal 11a and capacitor 26 is discharged. Capacitor 41 tends to discharge through resistor 42. The inductor 27-capacitor 26 circuit form a resonant circuit causing capacitor 26 to over discharge or reverse charge. Then the current reverses and flows through diodes 22 and 43. This causes gate-controlled rectifier 21 to switch to the off-state. As voltage begins to rise across rectifier 21, rectifier 38 is turned on by current flowing through capacitor 41 into the gate of diode 38. Because diode 38 is conducting, capacitor 31 is able to become charged, limiting the rate of rise of voltage applied across off-state rectifier 21. When capacitor 31 is fully charged rectifier 38 is able to switch to its non-conducting state. The period of the tuned circuits containing capacitor 26, inductor 27 and diodes 22 and 43 is such that rectifier 21 has time to fully recover and hold back line voltage. Since capacitor 31 has stored therein part of the energy that has been in the inductor 27-capacitor 26 circuit, the voltage across capacitor 31 is now more than the voltage across capacitor 26.

Terminal 11a has been made positive and returned to a zero potential completing one-half of an AC cycle. In the meantime, when gate-controlled rectifier 36f has been switched to its conducting state, capacitor 26' has been charged approximately to the voltage difference between terminals 12 and 16. Inductors 23 and 23', however, limit the amount of charge. As will be seen, this operational step-up happens only at the start of the event.

The negative half cycle is applied to terminal 11a by gating the gate-controlled rectifier 21' to its conducting state. At the same time rectifier 36 in circuit 18 has been switched to the conducting state to recover the energy stored in capacitor 31. When rectifier 36 is thus switched, the charge on capacitor 31 is transferred to capacitor 26 because the inductor 32 therein forms part of an oscillating circuit. The charge on capacitor 26 is less than the voltage across terminals 12 and 16 but equal to the voltage across rectifier 21 and is connected across rectifier 21 through rectifier 36 and diode 34. Now capacitor 26 acts as a dv/dt capacitor for rectifier 21 preventing a rapid rate of voltage increase thereacross. The voltage charge on capacitor 26 is now equal to the voltage across terminals 12 and 16.

In the meantime and as in circuit 18, inductor 27' - capacitor 26' form an oscillating circuit, so that when the capacitor 26' is reversed bias, the current reverses through diodes 22' and 43' and rectifier 21' is switched to its non-conducting state. As soon as rectifier 21' is switched to its off-state and voltage begins to rise across it, current flows through resistor 42a from capacitor 41a switching on rectifier 38a. This limits the dv/dt across diode 21' by allowing current to flow through diode 38a to charge the capacitor 31'. One complete alternating current cycle has been performed.

The next cycle starts again by switching on rectifiers 21 and 36'. Now some of the charge on capacitor 31' is transferred to capacitor 26', and capacitor 26' becomes charged to the voltage value between terminals 12 and 16. The circuit elements perform as they did during the previous cycles.

The switching time is preferably controlled by a separate circuit so that the frequency output is governed by an independent source.

Since the circuits 18 and 19 are similar in function but dissimilar in structure, the routine gating of rectifier 38a is controlled by the addition of a resistor 43, a diode 44 and a resistor 45 coupled to the gate and cathode electrodes of rectifier 38a and the capacitor 41a.

One skilled in the art can readily transform the latching herein to a self-running oscillator without departing from the spirit and scope of the invention. The invention is not limited to the exact embodiment as described but covers all embodiments falling within the scope of the claims.

I claim:

1. An electrical power transfer apparatus comprising:
   first and second input terminals adapted to be energized from a source of electrical power;
   b. first and second output terminals adapted to be coupled to a load;
   c. first circuit means coupling one of said input terminals to one of said output terminals;
   d. second circuit means coupling the other of said input terminals with one of said output terminals;
   e. diode means coupled in said first circuit means to control electrical power flow therethrough in bi-stable fashion;
   f. third circuit means including a first capacitor coupled with said first circuit means and adapted to control the rate of change of voltage across said diode means in one of the bi-stable states thereof; and
   g. fourth circuit means including a second capacitor adapted to recover the stored energy of said first capacitor.

2. The apparatus of claim 1 in which said diode means comprises a thyristor.

3. The apparatus of claim 1 in which said third circuit means is coupled in parallel with said diode means.

4. The apparatus of claim 1 in which said first capacitor is coupled in parallel with said diode means.

5. The apparatus of claim 1 in which said third circuit means includes switch means coupled in series with said first capacitor.

6. The apparatus of claim 5 in which said switch means comprises a thyristor.

7. The apparatus of claim 1 in which said fourth circuit means comprises a further switch means coupled in series with said second capacitor.

8. The apparatus of claim 7 in which said further switch means comprises a thyristor.

* * * * *